United States Patent
Giatilis et al.

(10) Patent No.: US 10,824,416 B2
(45) Date of Patent: *Nov. 3, 2020

(54) METHOD AND SYSTEM FOR A CLIENT TO SERVER DEPLOYMENT VIA AN ONLINE DISTRIBUTION PLATFORM

(71) Applicant: Unify Patente GmbH & Co. KG, Munich (DE)

(72) Inventors: Vasileios Giatilis, Palaio Faliro (GR); Lampros Pappas, Athens (GR)

(73) Assignee: Unify Patente GmbH & Co. KG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/549,518

(22) Filed: Aug. 23, 2019

(65) Prior Publication Data

US 2019/0377568 A1    Dec. 12, 2019

Related U.S. Application Data

(63) Continuation of application No. 16/053,982, filed on Aug. 3, 2018, now Pat. No. 10,437,582.

(30) Foreign Application Priority Data

Aug. 14, 2017  (EP) ..................... 17186175

(51) Int. Cl.
| | |
|---|---|
| *G06F 8/65* | (2018.01) |
| *G06F 8/60* | (2018.01) |
| *H04W 8/18* | (2009.01) |
| *H04L 29/08* | (2006.01) |
| *H04L 29/06* | (2006.01) |

(52) U.S. Cl.
CPC ............... *G06F 8/65* (2013.01); *G06F 8/60* (2013.01); *H04L 67/34* (2013.01); *H04W 8/18* (2013.01); *H04L 67/42* (2013.01)

(58) Field of Classification Search
USPC .......................................................... 717/173
See application file for complete search history.

(56) References Cited

U.S. PATENT DOCUMENTS

| | | | |
|---|---|---|---|
| 6,202,207 | B1 | 3/2001 | Donohue |
| 7,555,749 | B2 | 6/2009 | Wickham et al. |
| 2002/0084056 | A1 | 7/2002 | Hoffmann et al. |
| 2006/0026168 | A1 | 2/2006 | Bosworth et al. |
| 2012/0017207 | A1 | 1/2012 | Mahajan et al. |
| 2016/0011864 | A1 | 1/2016 | Fernandez-Ruiz et al. |
| 2016/0188311 | A1 | 6/2016 | Richard |

FOREIGN PATENT DOCUMENTS

KR        101190314 B1    10/2012

OTHER PUBLICATIONS

European search Report for European Patent Application No. 17186175.0 dated Mar. 6, 2018.

*Primary Examiner* — Qing Chen
*Assistant Examiner* — Clint Thatcher
(74) *Attorney, Agent, or Firm* — Buchanan Ingersoll & Rooney PC (57) ABSTRACT

An apparatus and a method for a client to server deployment via an online distribution platform can include a mechanism to update at least part of a system software or server-side software via a parallel client software update. Online distribution platforms such as mobile application stores can be utilized in embodiments of the apparatus and method to provide not only the client update, but also the system software update in the underlying system (e.g. server-side version).

19 Claims, 3 Drawing Sheets

METHOD AND SYSTEM FOR A CLIENT TO SERVER DEPLOYMENT VIA AN ONLINE DISTRIBUTION PLATFORM

CROSS REFERENCE TO RELATED APPLICATIONS

The present application is a continuation of U.S. patent application Ser. No. 16/053,982, which claims priority to European Patent Application No. EP 17186175.0, filed on Aug. 14, 2017. The entirety of this application is incorporated by reference herein.

FIELD

This innovation relates to telecommunication devices, methods and systems for upgrading software. Some embodiments can be configured so that software upgrades of specific components in a system's image utilizes mobile distribution platforms such as specific online application stores.

BACKGROUND

In some platform-based system solutions, e.g. similar to OpenScape Business X variants, there is often the problem of deploying separate patches, because the system solution might be delivered as a total image. The problem becomes more complex when trying to synchronize mobile or desktop applications or program versions with server side one. Small and Medium Enterprise System Solutions rely most of the times on hardware components somewhere in customer's company premises hidden from firewalls and other security restricted accesses. In these systems updates can often be installed manually or via specific connected servers. The most common case is that the aforementioned updates are given as a whole official release and it is rare to find occasions that customer install patches. Even patch delivery is a very difficult process which requires monitoring and history logging. Hence, safely upgrading a certain component isolated from other system software components is done via the total image.

Specific online distribution platforms such as mobile application stores like AppStore or Google's Play Store have developed a mechanism for upgrading applications/software via their own server which helped them monitoring what and how often something is upgraded. In parallel, these aforementioned application stores give the consumer the opportunity to upgrade automatically their apps/software without noticing it. This has become a common practice and users are familiar with the underlying process of these application stores. Most of the time, these updates must come together with server-side update. When this update is on a cloud server, this makes it a bit easier since the developer can update customers' applications/software almost at the same time instance as the server, or sometimes making the server compatible to old and new versions of the application/software. However, this requires two actions, one from the clients' side (or the mobile application side) and one from server side. This becomes more difficult when the service is not offered via a cloud server but must install manually on the hardware.

For example, in platform-based solutions like OpenScape Business these platforms can consist of different components which, for example, offer a telephony functionality on the one hand, and on the other hand a responsible software for the communication between system and clients like mobile apps (i.e. the Application Programming Interface, "API"). Whenever there is a new software for the client to be released, the developer has to take care of both updates, one for the client and the other for the server side. Hence, most of the time the developer has to wait until the server is updated and then could release the update for the client (e.g. an application to be updated on a customer's mobile phone).

SUMMARY

We have recognized that, since most of these aforementioned systems are distributed and are not centralized, there is no guarantee that all servers are in the latest compatible version to the latest client software update (e.g. the latest application available in the application store version, etc.). Embodiments of the present innovation are to provide an apparatus, a method, a system, as well as a computer program product stored on non-transitory computer readable medium (e.g. flash memory, a hard drive, etc.) for a client to server deployment via an online distribution platform. Such a distribution platform can include communication networks that may extend through one or more networks (e.g. one or more local area networks, one or more wide area networks, etc.). Communication devices such as network nodes, gateways, access points, and servers that each have hardware (e.g. a processor, non-transitory memory, at least one receiver, and at least one transmitter, etc.) can be included in the platforms across which deployment may occur. Embodiments can utilize a mechanism that can provide an update total or part of a system software or server-side software (for example, the aforementioned API) via a parallel client software update (e.g. a mobile application update). In some embodiments, online distribution platforms such as mobile application stores can be utilized in order to provide the client update (client side application update) and also the system software update in the underlying system (server-side version update).

In some embodiments, a method for client to server deployment via online distribution platforms can include:

a) Receiving a client software update and an image or at least a part of an image of a server-side software update at a client from an online distribution platform;

b) Approving the software update by the client to verify if a software update is necessary;

c) Updating/installing software update on the client and subsequent logging in to a server;

d) Requesting a server deployment from the server by the client;

e) Acknowledging the server deployment request of the client by the server;

f) Requesting a package of the image or at least a part of the image of the server-side software update from the client by the server;

g) Transferring the package of the image or at least a part of the image of the server-side software update from the client to the server; and h) Initializing of the deployment on the server.

It will be understood that embodiments of the method can be independent of any operating system. In some embodiments, the method can be defined by code that is stored in a non-transitory computer readable medium so that a device that processes the code via at least one processor can perform the method. For example, an embodiment of the method or an embodiment of the non-transitory computer readable medium can be embodied in an iOS, Windows, Android or any other operating system environment that may an operating system that is run by a telecommunications device or other electronic device.

In one advantageous embodiment, said online distribution platform may be an online store or a specific application store offering software as well as software updates which could be downloaded manually or automatically by the customer. In particular, said online distribution platforms may be such like the App Store from Apple or Play Store from Google and may be specific for a given operating system like iOS, Windows, Android etc.

In one advantageous embodiment said client is a piece of hardware or software that accesses a service made available by a server. In particular, said client may be a device such as a stationary PC or a mobile device such as a mobile phone, a smartphone, a tablet, a mobile personal computer ("PC"), a smart watch or the like. On the other hand the client may also be an application or software being installed on one of the aforementioned devices.

In another advantageous embodiment, said client software update is a specific application update, which is provided by a developer or an organization updating the software for this specific mobile application.

In another advantageous embodiment not one but a plurality of clients contributes to the server deployment, wherein the method comprises steps of:

a) Receiving a client software update and an image or at least a part of an image of a server-side software update at an at least one client of a plurality of clients from an online distribution platform;

b) Approving the software update by the at least one client of the plurality of clients to verify if a software update is necessary;

c) Updating/installing software update on the at least one client of the plurality of clients and subsequent logging in into the server;

d) Requesting a server deployment from the server by the at least one client of the plurality of clients;

e) Acknowledging the server deployment request of the at least one client of the plurality of clients by the server;

f) Requesting a package of the image or at least a part of the image of the server-side software update from the at least one client of the plurality of clients by the server;

g) Transferring the package of the image or at least a part of the image of the server-side software update from the at least one client of the plurality of clients to the server; and h) Initializing of the deployment on the server.

In another advantageous embodiment said server can send the acknowledgement together with an individual sequential or random package number to each client. Hence, in this case the server does not know how many clients will contribute to update software on the server side; hence, for every update request the server sends an acknowledgement with this sequential or random package number. The client or the software/application on client side receives this package numbering and waits until the server sends a message to all the clients participating to the upgrade of the total number of packages.

In a further advantageous embodiment, the server can set up a waiting time especially after method step d) mentioned above to receive eventually more requests of server deployments from other clients. If the server receives more requests of server deployments from other clients, the server can send a message with the total number of packages to all the clients participating in the upgrade. When these clients receive that total number, they divide the total image into equal and/or predetermined and/or random sized divided packages according to the total number and sending only the package which relates to the sequential or random package number they have been informed together with the acknowledgement. As said before the order of the packages in the acknowledgement or acknowledging message can be random. This can be exploited for enhancing the security for man-in-the-middle attacks.

In another advantageous embodiment the server is one of a plurality of servers in a system. It is understood that each server can be updated by the aforementioned method. If the servers are connected to each other, an update of a server not receiving the latest update version so far may be done by other servers and/or clients of a given system simultaneously.

In another advantageous embodiment said method provides an error handling for cases that during the upgrade process something goes wrong. For example, one of the clients (devices) is offline when the server requests finally to send the packages; or the acknowledgement never reaches the client (device), so that a sequence number is lost. Further errors can occur due to a package is corrupted or "the total number of packages"-message does not reach its destination. All such error cases can have the same effect—eventually the server is not capable of reconstructing the package and therefore cannot install the total image or at least a part of the image of the server-side software update. Therefore, the error handling will take place at the server side when there is a problem reconstructing the package. Whenever the server faces such an error, all available clients which are involved in the server deployment must contribute in solving the error. In such an event, the server will request from all available clients (devices) the package that is missing or is corrupt. The available clients after receiving that request will transfer this specific package to the server. When a proper package is evaluated and fits to complete the total image of the server-side software update, then all other of these transferred packages are discarded.

The overall benefit from this multiple instance process with a plurality of clients and/or servers is that firstly it enhances security if one tries to insert malicious software inside a server. This is because the more clients (devices) participate in the update process of the server, the more uncontrollable the process becomes from an attacker's point of view. The attackers would have to monitor all instances coming from and to the server, reconstruct packages according to the sequence number feedback etc. In parallel, embodiments of the method can provide the opportunity of fast deployment with a linear increase as a function of the number of clients (devices) involved in this process. The more devices, the faster the deployment of the server could be realized.

Another aspect of the present invention is a system for a client to server deployment configured for using the aforementioned method. Said system comprises a client, server and an online distribution platform to download a client software update and an image or at least a part of an image of a server-side software update. Thereby, the client of such a system has access to the online distribution platform and can be capable of downloading the client software update and the image or at least a part of the image of the server-side software update from this online distribution platform. A client is further capable of approving if a software update is necessary at all. If this approval does not happen, then there is no indication whatsoever that there is a new software update available. Furthermore, said client of said system is capable of installing the client software update and can be capable of log-in into the server to request a server deployment.

In embodiments of the communication apparatus and/or system, the server can be capable of acknowledging the server deployment request of the client and can be capable of requesting a package of the image or at least a part of the image of the server-side software update from the client. If the client receives such a request, it transfers the package of the image or at least a part of the image of the server-side software update to the server and then the server is capable of initializing the deployment.

According to one advantageous embodiment, the client and/or the server is at least one of a plurality of clients or servers being implemented in said system. In another advantageous embodiment, the online distribution store is an application store and/or the at least one of the plurality of clients is a device or mobile device such as a mobile phone, a smartphone, a tablet, a mobile PC, a smart watch and/or the client is an application or a software is installed on one of the aforementioned devices. A network connection (e.g. internet connection, etc.) can facilitate communications between the client device(s) and the server device(s)

In another advantageous embodiment, the client software update can be a specific application update. In another advantageous embodiment, in the event that a server is not capable of reconstructing the whole image or at least a part of the image of the server-side software update due to a missing sequence package or package corruption, the server requests the missing sequence package from all available clients in the system which is involved in the server deployment to complete the image or at least a part of the image of the server-side software update.

A further aspect of the present invention is a software product that is storeable on a non-transitory computer readable medium (e.g. an application storable on flash memory, etc.) for use in executing an embodiment of an aforementioned method via a physical side of a hardware environment. For instance, the software product can be stored on a computer-readable medium, preferably being directly loadable into an internal memory of a computer device (e.g. a smart phone, a tablet, a laptop, a desktop computer, etc.), and comprising program code for performing the steps of an embodiment of the method. The software product can be executed by said hardware environment, e.g. a computer device.

The hardware environment may be configured as a physical unit operated by a user, and a virtual unit providing virtual desktop services to said physical unit, said physical unit and said virtual unit can be connected via a network. In some embodiments, the physical unit can comprise or is embodied by or included in a telephone, mobile phone, smartphone, personal digital assistant ("PDA"), desktop computer, portable computer, tablet computer, or the like, and may be configured to operate as a fat client, thin client or zero-footprint client.

The virtual unit is preferably provided by a server instance (e.g. at least one server device having a processor connected to non-transitory memory), preferably being represented by a single server, data center, or cloud having multiple hardware servers at distributed places. It will be noted that the program code may be adapted to alter or extend software existing on said computer. As the software product of this aspect comprises program code for performing the steps of the method, the device provides any advantage the method provides. In particular, the program code may be program code of an operating system, any kind of software or application software such as server application, client application, mobile application, telecommunication software, routing software, an app, plug-in or extension, an update package or service package, and may be included in an installing package.

Embodiments of the present invention can include a computer program for controlling said method steps causing a hardware environment to perform the steps of the aforementioned method when said computer program is loaded in or executed by said hardware environment, and by a digital data carrier having electrically readable control signals which are designed to operate with a programmable hardware environment for controlling and performing the steps of the aforementioned method.

The following terms will be understood additionally to their usual meaning as described in the following:

Update/Upgrade will be additionally understood to improve a system or component(s) of a physical entity. This comprises: the process of replacing a product with a newer version of the same product; to improve functionality or solve problems e.g. with security via patches or hotfix and the like; to support industry regulatory requirements; to access emerging technologies with new features, and tools; to meet the demands of changing markets; to continue to receive comprehensive product support; and to improve the usability or performance of a system or physical entity. In some contexts of the present invention the term update can have also the meaning of the process of installing something to a certain system or physical entity.

The term deployment or deploy (sth.) will be additionally interpreted as a general process that has to be customized according to specific requirements or characteristics. This process can but not always have to comprise of certain deployment activities such as:

Release; The release activity follows from the completed development process, and is sometimes classified as part of the development process rather than deployment proper. It includes all the operations to prepare a system for assembly and transfer to the computer system(s) on which it will be run in production. Therefore, it sometimes involves determining the resources required for the system to operate with tolerable performance and planning and/or documenting subsequent activities of the deployment process.

Installation and activation; For simple systems, installation involves establishing some form of command, shortcut, script or service for executing the software (manually or automatically). For complex systems it may involve configuration of the system—possibly by asking the end-user questions about its intended use, or directly asking them how they would like it to be configured—and/or making all the required subsystems ready to use. Activation is the activity of starting up the executable component of software for the first time (not to be confused with the common use of the term activation concerning a software license, which is a function of Digital Rights Management systems). In larger software deployments on servers, the main copy of the software to be used by users—"production"—might be installed on a production server in a production environment. Other versions of the deployed software may be installed in a test environment, development environment and disaster recovery environment. In complex continuous delivery environments and/or software as a service systems, differently-configured versions of the system might even exist simultaneously in the production environment for different internal or external customers (this is known as a multi-tenant architecture), or even be gradually rolled out in parallel to different groups of customers, with the possibility of cancelling one or more of the parallel deployments. A "hidden live" group can also be created within a production environment, consisting of servers that are not yet connected to the production load balancer, for the purposes of blue-green deployment.

Deactivation; Deactivation is the inverse of activation, and refers to shutting down any already-executing components of a system. Deactivation is often required to perform other deployment activities, e.g., a software system may need to be deactivated before an update can be performed. The practice of removing infrequently used or obsolete systems from service is often referred to as application retirement or application decommissioning.

Uninstallation; Uninstallation is the inverse of installation. It is the removal of a system that is no longer required. It may also involves some reconfiguration of other software systems in order to remove the uninstalled system's dependencies.

Update; The update process replaces an earlier version of all or part of a software system with a newer release. It commonly consists of deactivation followed by installation. On some systems, such as on Linux when using the system's package manager, the old version of a software application is typically also uninstalled as an automatic part of the process.

Built-in update; Mechanisms for installing updates are built into some software systems (or, in the case of some operating systems such as Linux, Android and iOS, into the operating system itself). Automation of these update processes ranges from fully automatic to user initiated and controlled. Norton Internet Security is an example of a system with a semi-automatic method for retrieving and installing updates to both the antivirus definitions and other components of the system. Other software products provide query mechanisms for determining when updates are available.

Adaptation; The adaptation activity is also a process to modify a software system that has been previously installed. It differs from updating in that adaptations are initiated by local events such as changing the environment of customer site, while updating is a consequence of a new release being made available. Adaptation may require specialist technical skills such as computer programming, in certain complex cases.

The term "acknowledgement" will be understood as an acceptance of the server to allow a deployment. This process may depend on predetermined values of the server and/or the structure or content of the server-side update to be installed and/or the reliability or the identity of the client.

The term "Initializing the deployment on the server" will be understood as the process of actions with which the server begins the deployment process. Thereby the server can start this process when it has received a whole image of the server-side update but it is also possible that the server starts with this process even in the case if only a part or parts of the whole image is available at the server-side. If the server starts this process after receiving only a part or parts of the complete update and finish it later when the complete update is available at the server may depend on the predetermined values of the deployment process and/or the structure or content of the server-side update to be installed.

Further features, objects, advantages, and details of the present invention will become more apparent from the following description of specific embodiments of the invention and respective illustration in the appended drawings. Obviously, features, objects, advantages, and details of a specific embodiment, its variations and modifications mutatis mutandis apply to other embodiments, variations and modifications unless such application obviously violates technical constraints or laws of nature. Embodiments may be combined with each other, and any combination of an embodiment with another embodiment as a whole or in terms of single features thereof may be assumed to constitute an embodiment of the invention.

BRIEF DESCRIPTION OF THE DRAWINGS

Next, exemplary embodiments of a telecommunications device, apparatus, and system and methods of making and using the same are shown in the accompanying drawings. It should be understood that like reference numbers used in the drawings may identify like components.

A key for the reference signs used in the drawings is also provided below:
10 developer (e.g. developer computer device having a processor and non-transitory memory, a receiver, and a transmitter);
20, 21, 22 clients (each having a processor and non-transitory memory, a receiver, and a transmitter);
20a, 21a, 22a receiving client software update and image or at least a part of an image of server-side software update;
20b, 21b, 22b approving software update;
20c, 21c, 22c updating/installing software update;
20d, 21d, 22d requesting server deployment;
20e, 21e, 22e acknowledging server deployment request;
20f, 21f, 22f requesting a package of the image or at least a part of the image of the server-side software update;
20g, 21g, 22g transferring package of the image or at least a part of the image of server-side software update;
30 server (each server having a processor and non-transitory memory, a receiver, and a transmitter);
31 time window;
32 problem reconstructing the package server side;
33 Beginning of the deployment;
40 online distribution platforms;
X1 client offline;
X2 sequence number is lost X2;
X3 request(s) to send a package of the image or at least a part of the image of the server-side software update does not reach its destination;
X4 package is corrupted;
Y request of missing package;
transfer and receipt of missing package;

DETAILED DESCRIPTION

Now, the invention will be described in detail in its preferred exemplary embodiments, referring to the accompanying drawings. It is to be noted however that the drawings are purely schematic and not necessarily to scale. The drawings and descriptions are to illustrate the principle underlying the invention, not to limit the scope of the invention in any way. The present invention is only limited by the appended claims.

Figure 1:
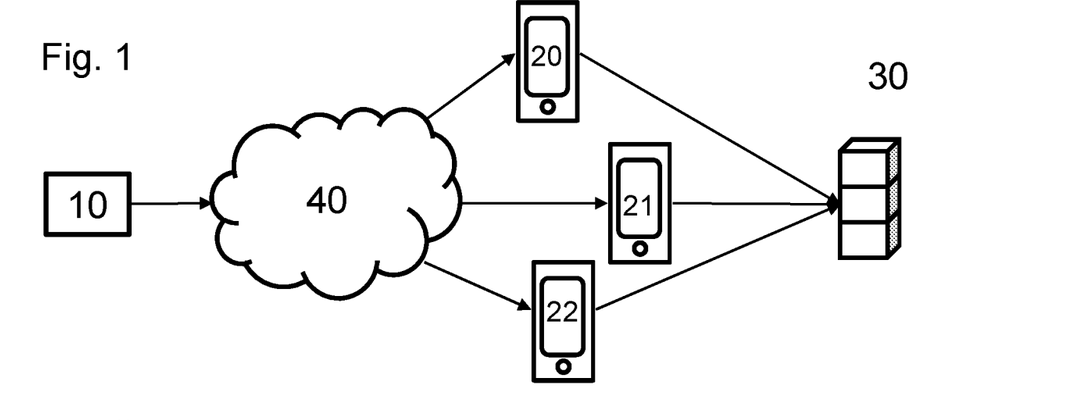
FIG. 1 is a schematic view showing an overview of an exemplary embodiment of a communication apparatus.

According to FIG. 1 a developer 10 or organization update the software for a client 20, 21, 22. The update provided by the developer 10 can be provided by a computer device of the developer 10 (e.g. a server, work station, or other computer device having hardware that includes a processor connected to non-transitory memory, at least one transmitter, and at least one receiver). This software update comprises an update for the client 20, 21, 22 and contains additionally an image of a server-side software update for a server 30 of a customer. These software updates are available in online distribution platforms 40 such as mobile application stores. The figure illustrates several clients 20, 21, 22 (devices) obtaining said update which apart from the software changes of the client 20, 21, 22 contains the image of the server-side software update. These clients 20, 21, 22 then deploy the software to the server 30 of a customer.

Figure 2:
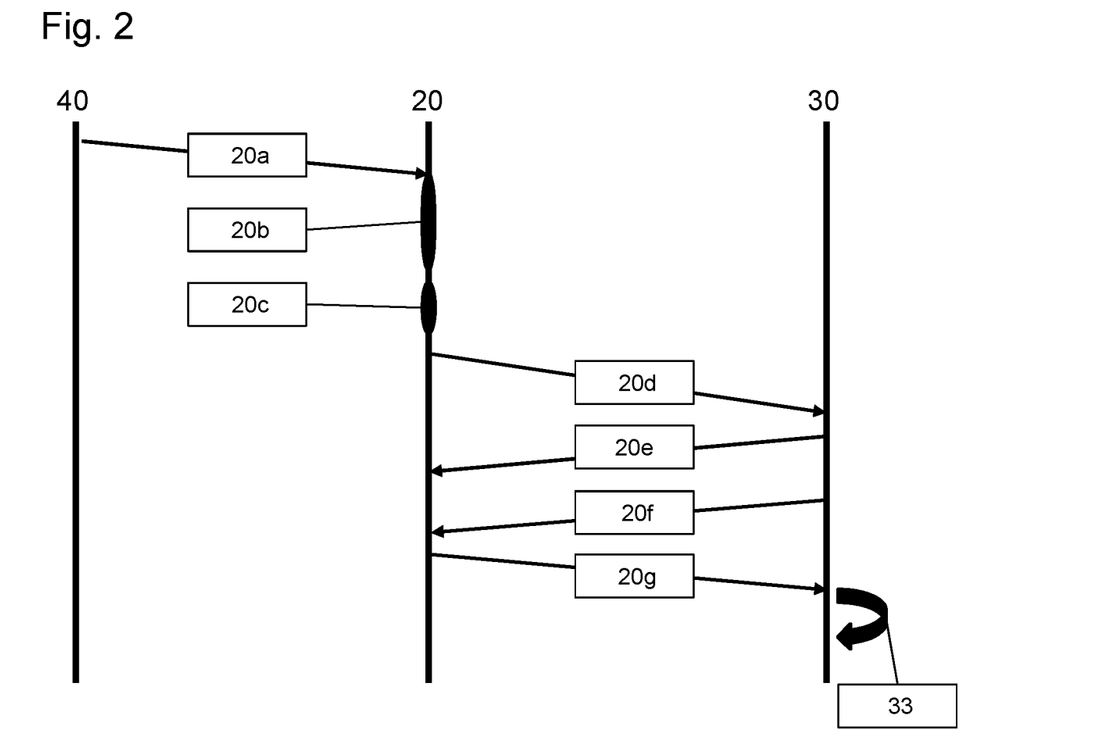
FIG. 2 is a schematic view showing an exemplary messaging of client to server deployment, when only one client (device) participates.

FIG. 2 shows a schematic illustrating an exemplary process by which a client 20 is updated with the new software and informs the server 30 about the availability of an image of a server-side software update. The client 20 receives a client-server update and an image or at least a part of an image of a server-side software update 20a by downloading it from an online distribution platform 40. Then a first timer is set where the client must approve the update 20b. If this approval 20b does not happen, then there is no indication whatsoever that there is a new software update available also for the server side. Then a second timer is set, where the client is installing/completing the update 20c and logs in to the server 30. After that step, the client is sending a server deployment request 20d to the server. The server is sending then an acknowledgement of the server deployment request together with a sequential or random package number 20e. Optionally the server can set up a window which will allow other clients also to express their request to upgrade the server-side software. The server 30 then requests the package from the client 20f and the client subsequently provides the software update package for the server 20g. After receiving the whole image or at least a part of the image the server initializes deployment 33.

Figure 3:
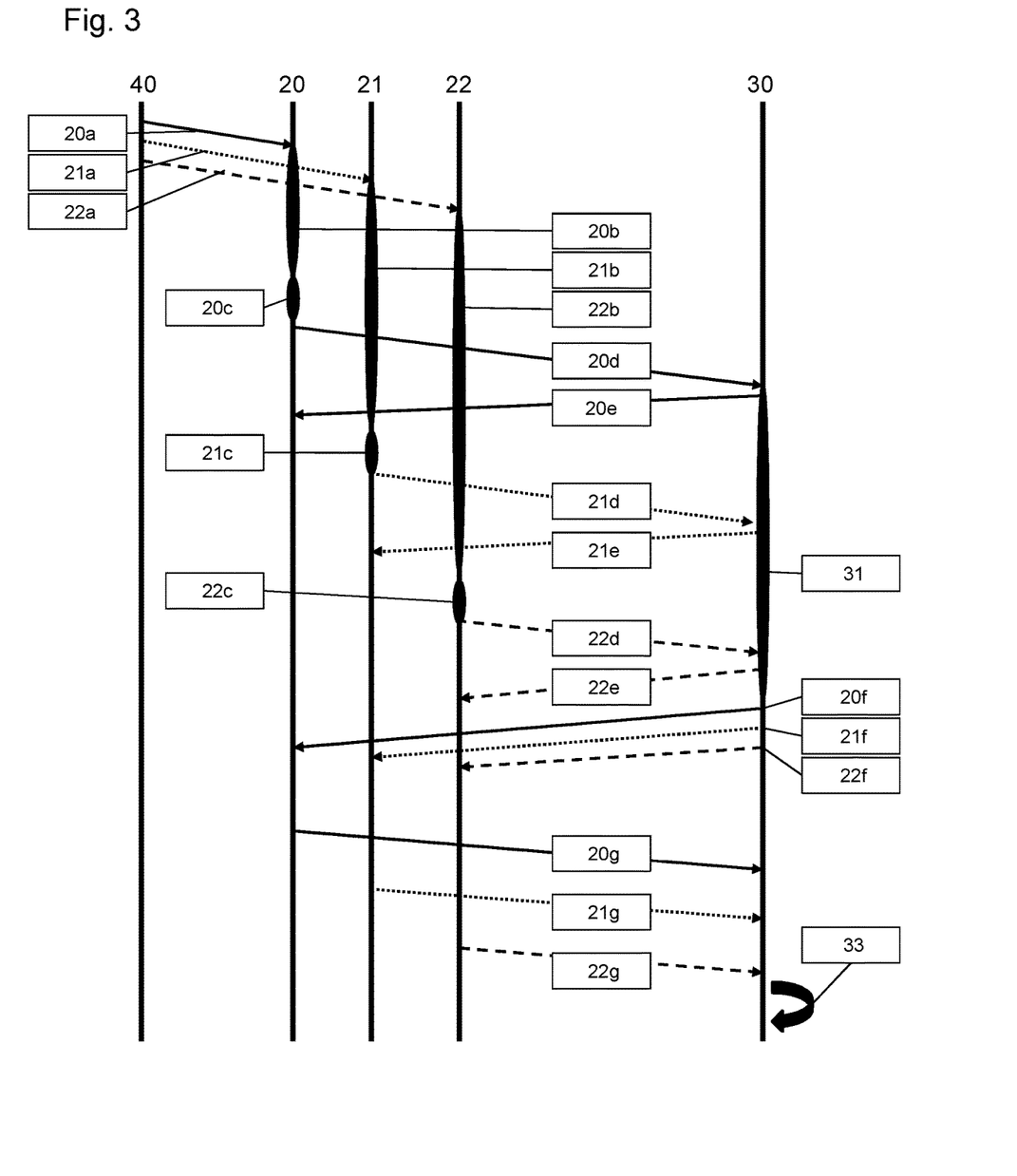
FIG. 3 is a schematic view showing an exemplary client to server deployment when a plurality of clients (devices) contributes to the software update on server side.

FIG. 3 illustrates an exemplary process by which the client to server deployment can occur when multiple clients 20, 21, 22 contribute to the process. In a schematic it can be seen how multiple clients 20, 21, 22 contribute to update the software on the server side 30. Client 20 related communications are depicted in continuous arrow-headed lines, client 21 related communications are depicted in dotted arrow-headed lines and client 22 related communications are depicted in dashed arrow-headed lines. In this case, server 30 does not know how many clients 20, 21, 22 will contribute to the updating/upgrading process, hence for every update request 20d, 21d, 22d the server 30 sends an acknowledgement ACK with a sequential or random package number 20e, 21e, 22e. The client 20, 21, 22 receives this sequential or random package numbering and waits. After receiving a first request for deployment 20d the server 30 sets up a time window 31 to wait if other requests of deployments of other clients will follow. After expiring of the time window 31, the server 30 sends a message to all clients participating to the upgrade process of the total number of packages 20f, 21f, 22f involved. After clients 20, 21, 22 have received that number they divide the total image or at least a part of the image into equal and/or predetermined and/or random sized divided packages and send only the one 20g, 21g, 22g they have been informed prior to the 31 time window closure. Subsequent, after all packages are received by the server 30, the server 30 then combines these packages and initializes deployment 33. As said before, the order of the packages in the acknowledgement messages 20e, 21e, 22e can be random. This can be exploited for enhancing the security for man-in-the-middle attacks.

Figure 4:
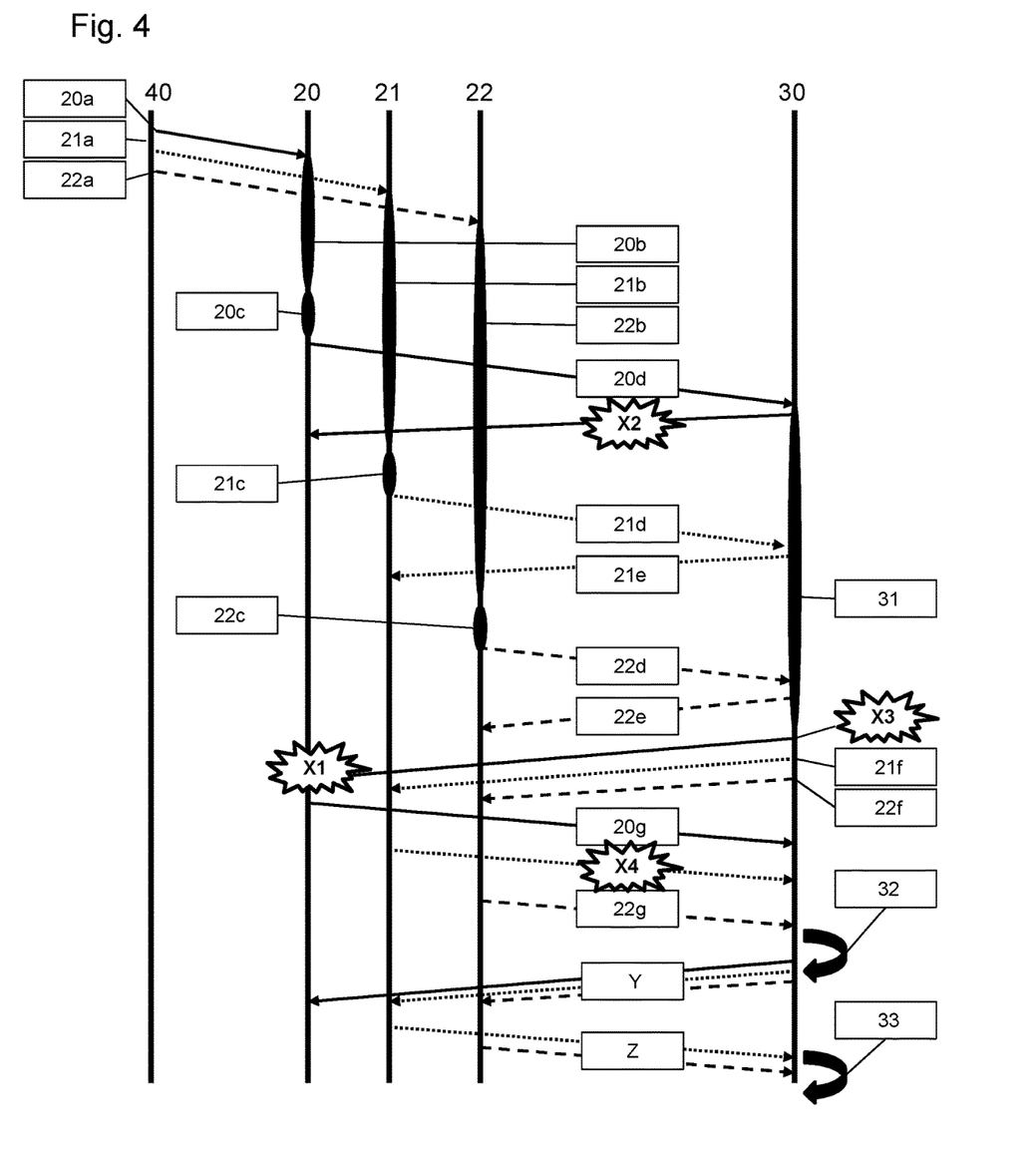
FIG. 4 is a schematic view showing an exemplary error-handling procedure when multiple clients contribute to the server-side software update.

FIG. 4 illustrates an exemplary error handling process of a client to server deployment if multiple clients contribute to the software update at server side according to FIG. 3. During this server-side upgrade process a lot of aspects can go wrong, for example:
- in the case the server 30 requests finally to send the packages 20f, 21f, 22f, one of the clients 20 is offline X1; and/or
- a certain acknowledgement message 20e never reaches a certain client 20, so that the sequence number is lost X2; and/or
- a "total number of packages"-message 20f does not reach its destination X3; and/or
- a package 21g is corrupted X4.

All these aforementioned cases X1, X2, X3, X4 have the same effect that eventually the server 30 is not capable of reconstructing the whole package, either by missing sequence package or of package corruption. So all error handling will take place at server side 30 when there is a problem reconstructing the package 32. Whenever such an error X1, X2, X3, X4 occurs, all available clients 20, 21, 22 must contribute in solving the error X1, X2, X3, X4, so that the package which is either missing or corrupted, will be sent/transferred from different sources/clients 20, 21, 22. Therefore the server 30 requests the missing package from all available clients Y. When a proper missing package is received Z by the server 30, it is evaluated and if it fits to complete the image then all other requested missing packages are discarded by the server 30 and the server subsequently begins deployment 33.

It should be appreciated that different embodiments of a telecommunication device, apparatus, or system can utilize different arrangements to meet a particular set of design criteria. For instance, it should be appreciated that some components, features, and/or configurations may be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiment. Thus, the components, features, and/or configurations of the various embodiments can be combined together in any manner and such combinations are expressly contemplated and disclosed by this statement. Therefore, while certain exemplary embodiments of a telecommunications device, apparatus, and system, and methods of making and using the same have been shown and described above, it is to be distinctly understood that the invention is not limited thereto but may be otherwise variously embodied and practiced within the scope of the following claims.

What is claimed is:

1. A method for a client to server deployment in a system via an online distribution platform, each client comprising a processor connected to a non-transitory computer readable medium, each server comprising a processor connected to a non-transitory computer readable medium, the method comprising:
   a) receiving a client software update and an image or at least a part of an image of a server-side software update at a client from an online distribution platform;
   b) approving the software update by the client to verify that a software update is necessary;

c) updating or installing the client software update on the client and subsequently logging in to a server;
d) requesting a server deployment from the server by the client; and
e) transferring the package of the image or at least a part of the image of the server-side software update from the client to the server.

2. The method of claim 1, also comprising at least one of:
f) acknowledging the server deployment request of the client by the server;
g) requesting a package of the image or at least a part of the image of the server-side software update from the client by the server; and
h) initializing deployment of the server-side software update on the server.

3. The method of claim 1 wherein the online distribution platform is an online store and/or an application store.

4. The method of claim 1 wherein the client is a mobile phone, a smart phone, a tablet, a mobile personal computer, or a smart watch.

5. The method of claim 1 wherein the client software update is an application update.

6. The method of claim 1 wherein a plurality of clients contributes to server deployment via a process comprising:
i) receiving a client software update and an image or at least a part of an image of a server-side software update at the plurality of clients from an online distribution platform;
ii) approving the software update by the plurality of clients to verify that a software update is necessary;
iii) installing software update on the plurality of clients and each of the clients subsequently logging in into the server;
iv) requesting a server deployment from the server by the plurality of clients; and
v) transferring the package of the image or at least a part of the image of the server-side software update from the plurality of clients to the server.

7. The method of claim 6, wherein the process also comprises at least one of:
vi) acknowledging the server deployment request of the plurality of clients by the server;
vii) requesting a package of the image or at least a part of the image of the server-side software update from the plurality of clients by the server; and
viii) initializing of the deployment of the server-side software update on the server.

8. The method of claim 1 comprising the server sending an acknowledgement together with an individual sequential or random package number to each client.

9. The method of claim 1 comprising the server setting up a waiting time to receive more requests of server deployments from other clients.

10. The method of claim 1 wherein the server is one of a plurality of servers.

11. The method of claim 1 comprising:
upon a determination that the server is unable to reconstruct an entirety of an image of the server-side software update due to a missing sequence package or package corruption, the server requesting the missing sequence package or corrupted package to complete the image of the server-side software update from available clients in the system to receive each and every missing sequence package and corrupted package from available clients.

12. A telecommunication apparatus for a client to server deployment comprising:
a client comprising a processor connected to non-transitory computer readable medium;
the client having access to an online distribution platform and being configured to download a client software update and an image or at least a part of the image of a server-side software update for a server from this online distribution platform;
the client configured to install the client software update and log in to the server to request a server deployment in response to determining that a client software update is necessary;
wherein the server is configured to acknowledge the server deployment request of the client and request a package of the image or at least a part of the image of a server-side software update from the client in response to the server deployment request of the client; and
wherein the client is configured to transfer at least one package of the image or at least a part of the image of the server-side software update from the client to the server in response to receiving an acknowledgement from the server concerning the server deployment request.

13. The telecommunication apparatus of claim 12, comprising:
the server, wherein the server is configured to initialize deployment of the server-side software update in response to receiving the at least one package of the image or at least a part of the image of the server-side software update.

14. The telecommunication apparatus of claim 13 wherein the client is at least one of a plurality of clients in a communication system and/or wherein the server is at least one of a plurality of servers in the communication system.

15. The telecommunication apparatus of claim 12 wherein the online distribution platform is an application store, and wherein the client is a mobile phone, a smart phone, a tablet, a mobile personal computer, or a smart watch, and wherein the client software update is an application update.

16. The telecommunication apparatus of claim 12 comprising:
the server, wherein the server is configured so that, in response to determining that the server is unable to reconstruct a whole image or at least a part of the image of the server-side software update due to a missing sequence package or package corruption, the server requests each and every missing sequence package from all available clients that are involvable in the server deployment to complete the image or at least a part of the image of the server-side software update.

17. The telecommunication apparatus of claim 16, wherein the client is configured to transfer at least one missing package to the server in response to the request for each and every missing sequence package from the server.

18. A non-transitory computer readable medium having code stored thereon, the code defining a method that is performed by a client computer device that runs the code, the method comprising:
a) receiving a client software update and an image or at least a part of an image of a server-side software update from an online distribution platform;
b) approving the software update to verify that a software update is necessary;
c) installing the software update on the client and subsequent logging in to a server to which the client computer device is communicatively connectable;

d) requesting a server deployment from the server by the client computer device to facilitate receipt of an acknowledgement from the server;

f) the client computer device transferring at least one package of the image or at least a part of the image of the server-side software update from the client computer device to the server in response to receiving the acknowledgement from the server.

19. The non-transitory computer readable medium of claim 18, wherein the client computer device is a mobile phone, a smart phone, a tablet, a mobile personal computer, a personal computer, or a smart watch.

* * * * *